United States Patent [19]
Meyer et al.

[11] Patent Number: 5,504,720
[45] Date of Patent: Apr. 2, 1996

[54] FIBER OPTIC PLANAR HYDROPHONE

[75] Inventors: A. Douglas Meyer, West Hills, Calif.; Bruce Danver, Alexandria; Emery Moore, Blacksburg, both of Va.

[73] Assignee: Litton Systems, Inc., Woodland Hills, Calif.

[21] Appl. No.: 406,475

[22] Filed: Mar. 20, 1995

Related U.S. Application Data

[63] Continuation of Ser. No. 68,526, May 28, 1993, abandoned.

[51] Int. Cl.⁶ .................................................. H04R 23/00
[52] U.S. Cl. ........................... 367/149; 356/345; 356/358
[58] Field of Search ........................... 367/149; 356/345, 356/358

[56] References Cited

U.S. PATENT DOCUMENTS

| | | | |
|---|---|---|---|
| 4,525,818 | 6/1985 | Cielo et al. | 367/149 |
| 4,534,222 | 8/1985 | Finch et al. | 73/653 |
| 4,893,930 | 1/1990 | Garrett et al. | 356/345 |
| 5,155,548 | 10/1992 | Danver et al. | 356/345 |
| 5,212,670 | 5/1993 | Brown | 367/149 |
| 5,253,222 | 10/1993 | Danver et al. | 367/149 |
| 5,285,424 | 2/1994 | Meyer | 367/149 |

FOREIGN PATENT DOCUMENTS

| | | |
|---|---|---|
| 0489514A3 | 11/1991 | European Pat. Off. . |
| 2171514 | 2/1986 | United Kingdom . |

OTHER PUBLICATIONS

"Fiber Optic Sensor for Planar Array," *Critical Technology*, Apr. 1993, pp. 485–496.

*Primary Examiner*—J. Woodrow Eldred
*Attorney, Agent, or Firm*—John H. Lynn

[57] ABSTRACT

A plurality of air-backed elongate mandrels are arranged in an planar array such that their longitudinal axes are parallel. A length of a first optical fiber is wound around portions of each mandrel in a first group of the mandrels for exposure to the parameter. The first optical fiber is arranged such that exposing it to the parameter to be sensed causes the length of the first optical fiber to increase and decrease in direct proportion as the parameter increases and decreases. A length of the second optical fiber is wound around a second group of the mandrels for exposure to the parameter. The second optical fiber preferably is arranged such that exposing it to the parameter to be sensed causes the length of the second optical fiber to increase and decrease in inverse proportion as the parameter increases and decreases.

5 Claims, 3 Drawing Sheets

FIBER OPTIC PLANAR HYDROPHONE

This application is a continuation of Ser. No. 08/068,526, filed May 28, 1993, now abandoned.

BACKGROUND OF THE INVENTION

This invention relates generally to fiber optic acoustic sensors and particularly to fiber optic acoustic sensors for underwater use. Still more particularly, this invention relates to apparatus and methods for providing a hydrophone having a planar configuration.

The conventional method for the detection of acoustic pressures underwater is perormed by piezoelectric elements. Traditionally, ceramic elements and, more recently, electrically active polymer films have been employed. Associated with these transducers are the required electronics to amplify the signal prior to transmitting it along data-bus.

Conventional acoustic sensor are electrically active; and it is, therefore, necessary to supply power to the sensors. This tends to add weight, bulk, complexity, and cost to the system. In addition, if a breach should occur in the "wet end" sub-system, the hydrophone and associated electronics will be exposed to the underwater environment. This may cause the system to malfunction and ultimately fail. Further, piezoelectric systems have a limited acoustic sensitivity, are often sensitive to acceleration, and are prone to extraneous electromagnetic signal pickup. Additionally, the greater number of sensors that are needed for the detection of quieter acoustic signals, will increase the transmission bandwidth and associated bit which will intern limit the ultimate system performance.

Previous fiber optic acoustic sensors have a generally cylindrical configuration.

SUMMARY OF THE INVENTION

This invention is directed to an acoustic sensor that is planar in dimension rather than the previous cylindrical units. This design shows good rejection to acceleration and is environmentally robust. The hydrophone according to the present invention is suitable for large area hull mounted array applications and for stationary array applications.

Advantages of this design include but are not limited to; passive detection of the acoustic signal, no electrical power needed at the sensor, easily multiplexed into large arrays, light weight, tunable scale factor, and insitivity to EMI and EMP.

A planar fiber optic sensor according to the present invention in which optical signals are introduced into a pair of optical fibers coupled together to form an interferometer comprises a plurality of elongate mandrels arranged in a planar array such that their longitudinal axes are parallel. A length of a first one of the pair of optical fibers is wound around a portions of each mandrel in a first group of the mandrels for exposure to the parameter. The first optical fiber is arranged such that exposing it to the parameter to be sensed causes the length and index of refraction of the first optical fiber to increase and decrease in direct proportion as the parameter increases and decreases. A length of the second optical fiber is wound around a second group of the mandrels for exposure to the parameter. The second optical fiber is arranged such that exposing it to the parameter to be sensed causes the length and index of refraction of the second optical fiber to increase and decrease in inverse proportion as the parameter increases and decreases.

An appreciation of the objectives of the present invention and a more complete understanding of its structure and method of operation may be had by studying the following description of the preferred embodiment and by referring to the accompanying drawings.

DESCRIPTION OF THE PREFERRED EMBODIMENT

Figure 1:
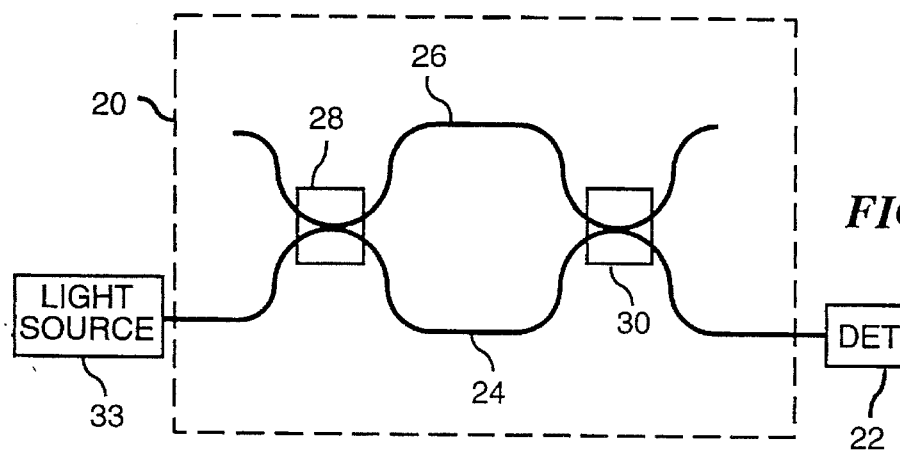
FIG. 1 illustrates a fiber optic interferometric sensor that may be included in a planar hydrophone array according to the present invention.

FIG. 1 illustrates a Mach-Zehnder interferometer 20 arranged to provide an optical signal output to a photodetector 22 according to the present invention. The Mach-Zehnder interferometer 20 is illustrative of a fiber optic sensor that may be used to practice the present invention. Other devices, such as a Michelson interferometer (not shown), may be used in practicing the present invention. The following description of the present invention as used with the Mach-Zehnder interferometer 20 should be understood as illustrative of the invention rather than as limiting the scope of the invention in any way.

The Mach-Zehnder interferometer 20 includes a pair of optical fibers 24 and 26 connected between a pair of fiber optic couplers 28 and 30. The fiber optic couplers 28 and 30 may be formed from separate fibers (not shown) and then connected to the fibers 24 and 26 via splices (not shown). The optical fibers 24 and 26 are preferably ordinary singlemode, non-polarization-maintaining fibers. The fiber optic couplers 28 and 30 preferably are evanescent field couplers.

A light source 33 produces optical signals that are input to the optical fiber 24, which guides these optical signals to the fiber optic coupler 28. The fiber optic coupler 28 couples a fraction of intensity of the optical signals from the light source out of the optical fiber 24 into the optical fiber 26. In a typical application of the Mach-Zehnder interferometer 20 half of the optical signal intensity input to the fiber optic coupler 28 is coupled out of the optical fiber 24 into the optical fiber 26. Both of the optical fibers 24 and 26 then guide optical signals of equal intensity from the fiber optic coupler 28 to the fiber optic coupler 30.

Just after exiting the fiber optic coupler 28, the signals guided by the optical fibers 24 and 26 are in phase. The fiber optic coupler 30 couples part of the signal guided by the optical fiber 26 back into the optical fiber 24 where the signals combine. The two signals guided by the optical fibers 24 and 26 follow different optical paths so that, in general, there is a phase difference between the signals when they combine in the fiber optic coupler 30. The combined signals then propagate in the fiber 24 to the right of the coupler 30 to the detector 22 as viewed in FIG. 1.

Figure 2:
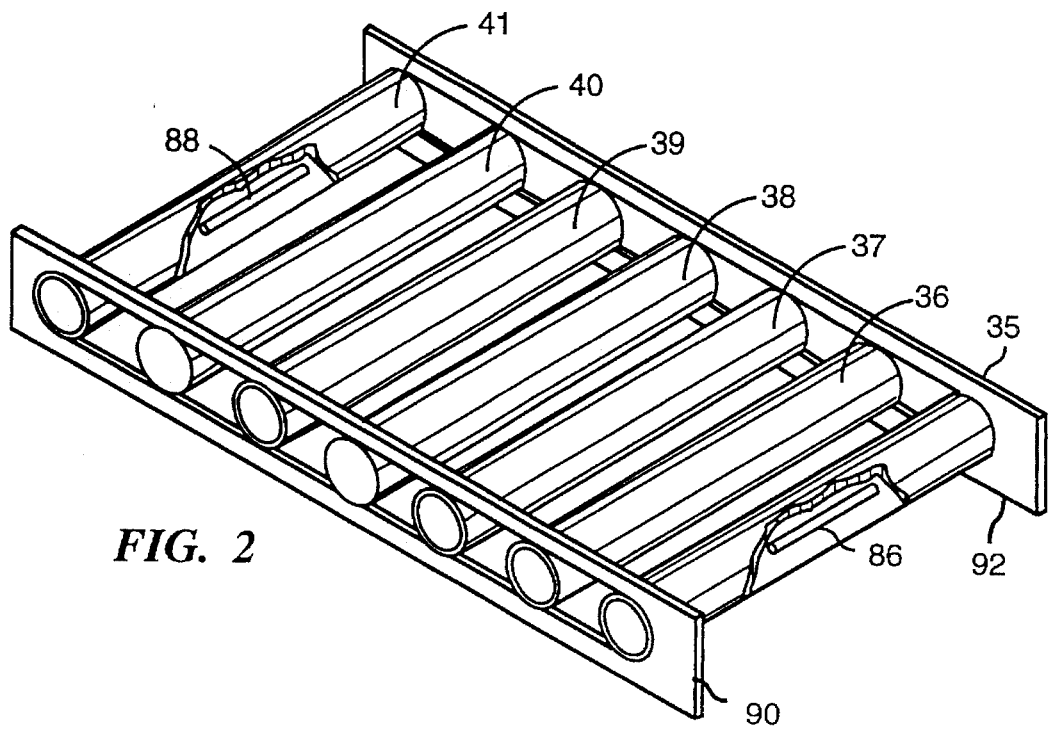
FIG. 2 is a perspective view of a planar hydrophone array according to the present invention.
Figure 3:
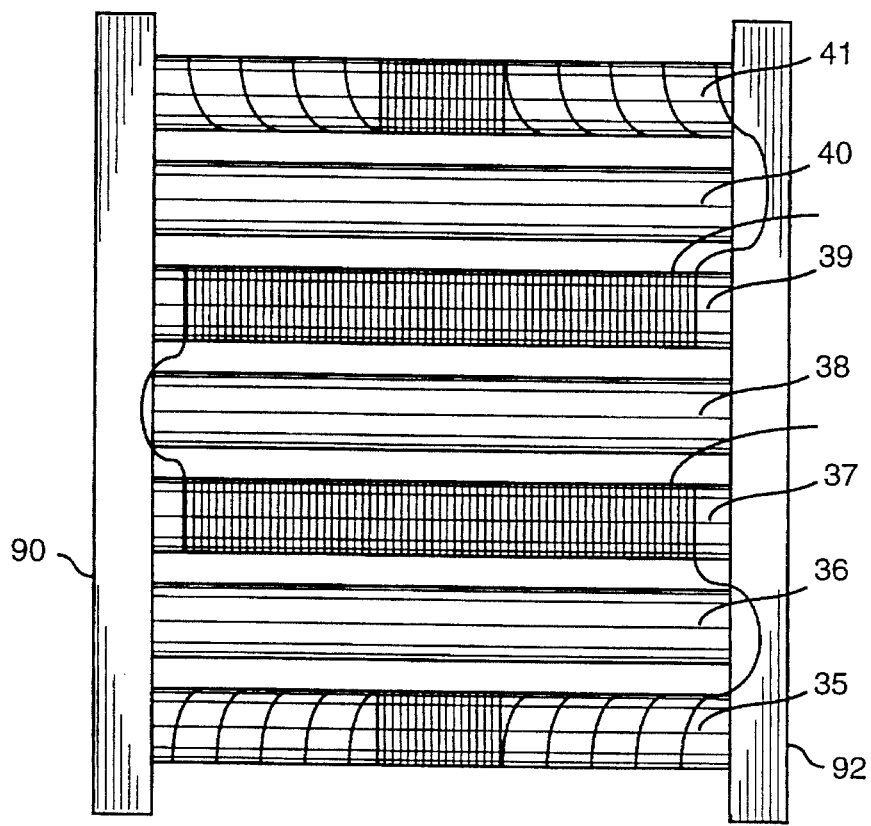
FIG. 3 is a plan view of a planar hydrophone structure according to the present invention.

Referring to FIGS. 2 and 3, a fiber optic sensor according to the present invention includes a Mach-Zehnder interferometer similar to that described above with reference to FIG. 1. The portions of the fibers 24 and 26 between the couplers 28 and 30 are wrapped around a plurality of mandrels 35–41 as described subsequently with reference to FIGS. 2–4. The fiber optic couplers 28 and 30 may be placed inside the mandrels 35 and 41, respectively.

Figure 4:
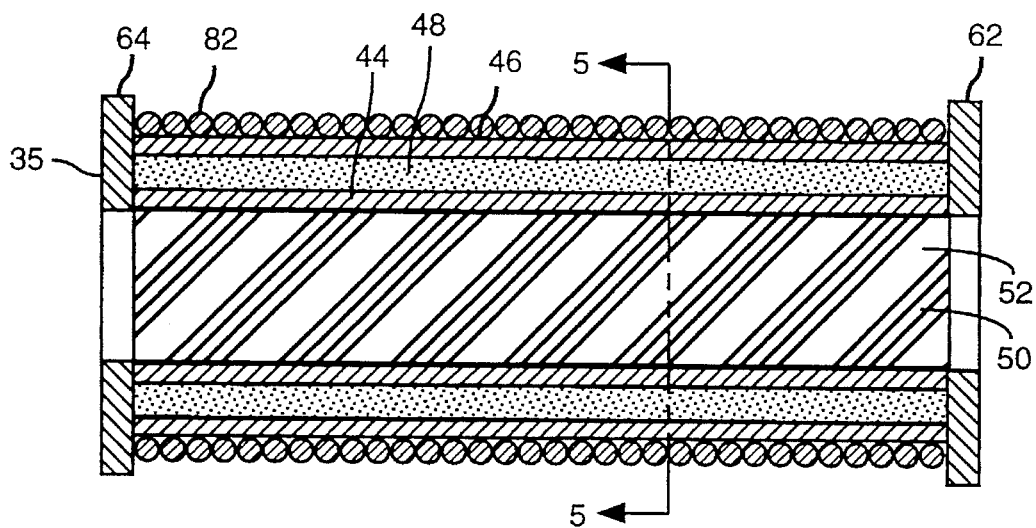
FIG. 4 is a cross-sectional view showing a first fiber optic coil formed on an outer portion of an air-backed sensing mandrel that may be included in the planar hydrophone array of FIG. 2.
Figure 5:
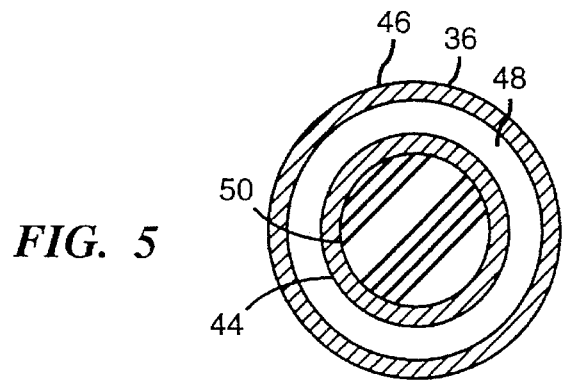
FIG. 5 is a cross-sectional view along line 5—5 of FIG. 4.

Referring to FIGS. 4 and 5, the mandrel 35 preferably includes an inner cylinder 44 and the outer cylinder 46. The cylinders 44 and 46 are preferably arranged so that they are concentric. A cavity 48 is enclosed by the inside of the outer cylinder 46 and the outside of the inner cylinder 44. The cavity 48 preferably is filled with air or other similar gas. This air filled cavity 48 provides the compliance that increases the response of the fiber optic sensor to incident acoustic signals. The inner cylinder 44 encloses a region 50 that preferably is filled with polyurethane 52 or other similar substance. The ends of the cylinders 44 and 46 are sealed so that no water or other substance enters the region 48 when the fiber optic sensor 30 is in use.

A portion 82 of the optical fiber 24 is wrapped under tension around the outer cylinder 46. The mandrel 35 may include a pair of end flanges 62 and 64 that help retain the coiled portion 60 of the optical fiber 24 on the outer cylinder 46. When the sensor is submerged in water, the portion 60 of the optical fiber 24 is exposed to acoustic waves that are being monitored. Increases in acoustic pressure compress the portion 60 of the optical fiber 24 and the outer cylinder 46 and shorten the optical path length of optical signals propagating therein. Decreases in acoustic pressure on the portion 60 of the optical fiber 24 allow the cylinder to expanding in diameter, which stretches the optical fiber 24 and increases the optical path length.

Figure 6:
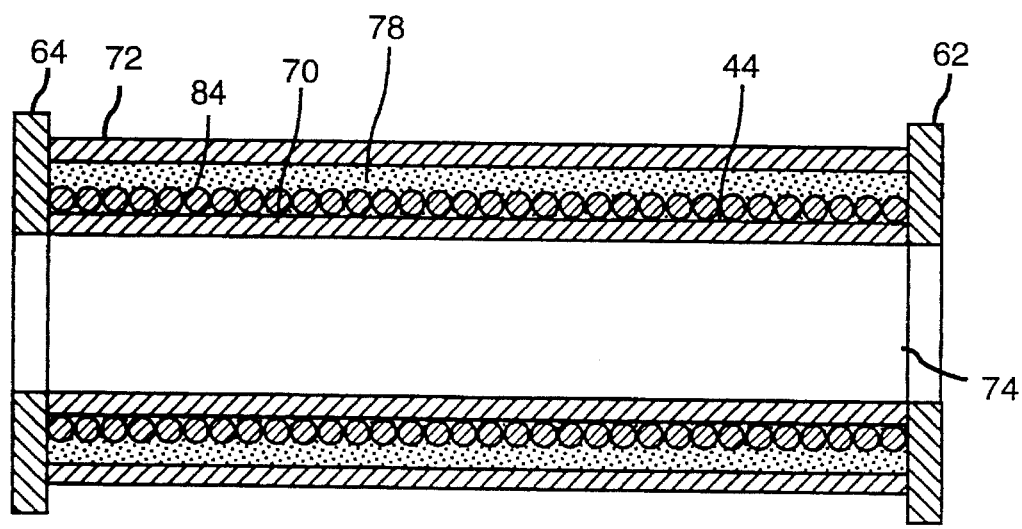
FIG. 6 is a cross-sectional view showing a second fiber optic coil formed on an inner portion of an air-backed sensing mandrel that may be included in the planar hydrophone array of FIG. 2.

Referring to FIG. 6, the mandrel 36 is formed to have inner and outer cylinders 70 and 72 that may be essentially identical to the cylinders 44 and 46, respectively as described above with reference to FIGS. 2 and 3. The cylinders 70 and 72 enclose a cavity 78 that is filled with air or other similar gas. A portion 84 of the optical fiber 26 is wrapped under tension around the inner cylinder 70 and is isolated from direct contact with the water when the system is in use to monitor underwater acoustic pressure. Instead of being filled with polyurethane, the inside of the cylinder 70 is exposed to water. Therefore, increases in acoustic pressure expand the cylinder 70, stretching the optical fiber 26 and increasing the optical path length of optical signals propagating therein. Decreases in acoustic pressure cause a decrease in the optical path length of optical signal propagating in the optical fiber 26.

Referring to FIGS. 2 and 3, the mandrels 37, 39 and 41 are essentially identical to the mandrel 35. Accordingly the mandrels 37, 39 and 41 have fiber coils formed on their outer cylinders. The mandrels 35, 37, 39 and 41 are sometimes referred to as sensing mandrels.

The mandrels 38 and 40 are essentially identical to the mandrel 36 and have fiber coils formed on their inner cylinders. The group of mandrels 36, 38 and 40 have covers placed over the fiber 26 so as to invert the polarity of the response of the fiber 26 to acoustic pressure. The mandrels 36, 38 and 40 are sometimes referred to as reference mandrels.

The mandrels 35–41 are preferably mounted between a pair of frame members 90 and 92. The frame member 90 is an elongate structure having an elongate opening 94 therein. The frame member 92 may be essentially identical to the frame member 60. The ends of the mandrels 35–41 fit between the frame members 90 and 92 so that all of the mandrels 35–41 are parallel. The frame members 90 and 92 may be secured to the mandrels 35–41 by an epoxy resin or other suitable adhesive.

The number and composition of the mandrels 35–41 can be varied depending on the application. The sensor illustrated in FIGS. 2 and 3 was constructed using seven mandrels. Four of these are sensing mandrels that have optical fiber wrapped around the outside of an air backed cylinder. The other three mandrels are reference mandrels that have the optical fiber wrapped around the inner cylinders of an air backed mandrel. Each mandrel is preferably wound with a continuous length of optical fiber so there are no splices between them. The amount of fiber that is on sensing and reference mandrels is selected so that the total length of optical fiber for each type of mandrel is equal.

The frames members 90 and 92 are held in place by a bracket (not shown) until the interferometer is built. The portions 100 of the fiber that transits from one mandrel to another is preferably glued to the adjacent frame member wherever possible to protect the fiber from damage.

Optical couplers 86 and 88 are then fusion spliced on to each end of the fibers 82 and 84 to finish the Mach-Zehnder interferometer configuration. However, one coupler can be replaced by a pair of mirrors to make a Michelson configuration (not shown). The interferometer works in a push pull fashion. When the sensing mandrels 35, 37, 39 and 41 encounter an acoustic pressure wave, the optical fiber 80 wrapped around the outside of the sensing mandrels shrinks in length as the pressure increases and then elongates as the pressure decreases. The optical fiber 82 wrapped around the reference mandrels 36, 38 and 40 with the covers operates in the opposite manner. This opposite reaction to the pressure wave has the effect of increasing the overall sensitivity of the sensor by a factor of two as compared to interferometric sensors that have one leg exposed to the acoustic wave and one leg isolated therefrom. Additionally, since both arms of the interferometer are wrapped around mandrels of similar mass they respond equally when exposed to acceleration. This has the effect of canceling out the acceleration inputs.

A simpler application of the basic principles of the invention is to have no covers on the reference mandrels 36, 38 and 40 so that the portions of the fiber wrapped around these mandrels is exposed to the water. Exposing the fiber 82 to the water has the effect of reducing the sensitivity of the sensor by a factor of two. When configured in this manner, the interiors 50 and 74 are filled with similar potting compounds. The optical couplers, splices, and mirrors (if included in the fiber optic sensor 30) are protected by potting them in the center of the air backed mandrels. Potting material can be any potting compound that exhibits low shrinkage, low thermal expansion, is incompressible and is strong enough to withstand hydrostatic pressure on the order of 1000–2000 psig. The exterior of the fiber optic sensor 30 can then be potted with a polyurethane material for protection from the effects of sea water on the mandrels 31A, 31B, etc. and handling on the optical fibers 70 and 727.

Figure 7:
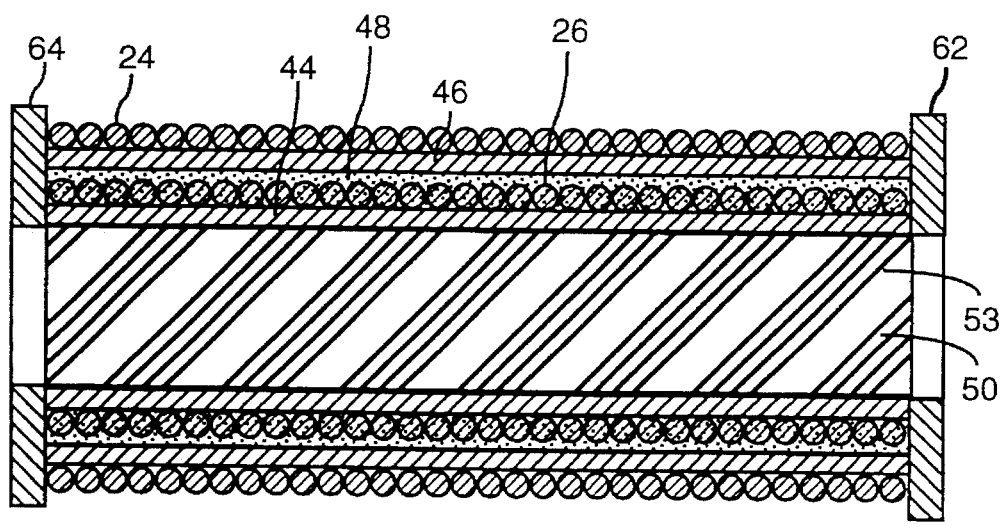
FIG. 7 is a cross-sectional view illustrating an alternate embodiment of the invention.

FIG. 7 illustrates an alternate embodiment of the sensor configuration according to the present invention. Referring to FIG. 7, the optical fiber 24 of the interferometer 20 is wrapped around the exterior of the mandrel 46. The second optical fiber 26 of the interferometer 20 is wrapped around mandrel 44. The two mandrels, 44 and 46 are then made to be coaxial and to form the compliant cavity 48. The central bore 50 of mandrel 44 is filled with an epoxy resin material 53. The cavity 48 and the potting material 53 serve to isolate the optical fiber 26 from the surrounding environment and render it acoustically insensitive when compared to the optical fiber 24. A plurality of mandrel pairs 44 and 46 are arranged in a planar fashion in a manner similar to that illustrated in FIGS. 2 to create the acoustic sensor.

The fabrication and the principle of operation of this device shown in FIG. 7 is the same for those described for the other embodiments. In this case only one arm of the interferometer 20 is sensitive to the environment and the other is the reference arm.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A planar fiber optic sensor in which optical signals are introduced into first and second optical fibers coupled together to form an interferometer for measuring changes in a parameter, comprising:

a frame comprising first and second elongate frame members arranged to be spaced apart and generally parallel;

a plurality of elongate sensing mandrels mounted between the first and second elongate frame members and arranged in an planar array such that their longitudinal axes are spaced apart and parallel, each of the plurality of elongate sensing mandrels comprising:
an inner cylinder; and
an outer cylinder, the inner and outer cylinders arranged to have concentric longitudinal axes such that a sealed, gas-filled cavity is formed between the inner and outer cylinders and a sealed cavity is formed inside the inner cylinder;

a plurality of elongate reference mandrels mounted between the first and second elongate frame members and arranged in an planar array such that their longitudinal axes are spaced apart and parallel, each of the plurality of elongate reference mandrels comprising:
an inner cylinder; and
an outer cylinder, the inner and outer cylinders arranged to have concentric longitudinal axes such that a cavity is formed between the inner and outer cylinders and an open-ended cavity is formed inside the inner cylinder;

a length of the first optical fiber wound around the outer cylinder of each sensing mandrel for exposure to the parameter, the first optical fiber being arranged such that exposing it to the parameter causes the length of the first optical fiber to increase and decrease in inverse proportion as the parameter increases and decreases; and a length of the second optical fiber wound around the inner cylinder of each reference mandrel inside the sealed, gas-filled cavity such that changes in the parameter inside the inner cylinder cause the length of the second optical fiber to increase and decrease in direct proportion as the parameter increases and decreases.

2. A planar fiber optic interferometric sensor in which optical signals are introduced into first and second optical fibers coupled together to form an interferometer for measuring changes in a parameter, comprising:

a frame comprising first and second elongate frame members arranged to be spaced apart and generally parallel;

a plurality of elongate sensing mandrels mounted between the first and second elongate frame members and arranged in an planar array such that their longitudinal axes are spaced apart:

a sensing optical fiber having portions coiled around each of the sensing mandrels and exposed to the parameter to form a sensing optical path for the fiber optic interferometric sensor, the sensing optical fiber being arranged such that exposing it to the parameter causes the length of the sensing optical fiber to increase and decrease in inverse proportion as the parameter increases and decreases;

a plurality of elongate reference mandrels mounted between the first and second elongate frame members and arranged in an planar array such that their longitudinal axes are spaced apart and parallel, the sensing and reference mandrels being placed in an array in an alternating arrangement and perpendicular to the first and second elongate frame members;

a reference optical fiber having portions wound around the outer cylinder of each reference mandrel to form a reference optical path for the fiber optic interferometric sensor and the reference optical fiber being arranged such that changes in the parameter cause the length of the reference optical fiber to increase and decrease in direct proportion as the parameter increases and decreases such that exposing the planar fiber optic interferometric sensor to the parameter causes unequal changes in the sensing and reference optical paths.

3. A planar fiber optic sensor in which optical signals are introduced into first and second optical fibers coupled together to form an interferometer for measuring changes in a parameter, comprising:

a frame comprising first and second elongate frame members arranged to be spaced apart and generally parallel;

a plurality of elongate sensing mandrels mounted between the first and second elongate frame members and arranged in an planar array such that their longitudinal axes are spaced apart and parallel, each of the plurality of elongate sensing mandrels comprising:
an inner cylinder; and
an outer cylinder, the inner and outer cylinders arranged to have concentric longitudinal axes such that a sealed, gas-filled cavity is formed between the inner and outer cylinders and a sealed cavity is formed inside the inner cylinder;

a plurality of elongate reference mandrels mounted between the first and second elongate frame members and arranged in an planar array such that their longitudinal axes are spaced apart and parallel, each of the plurality of elongate reference mandrels comprising:
an inner cylinder; and
an outer cylinder, the inner and outer cylinders arranged to have concentric longitudinal axes such that a cavity is formed between the inner and outer cylinders and an open-ended cavity is formed inside the inner cylinder, the sensing and reference mandrels being placed in the frame in an array in an alternating arrangement with the sensing and reference mandrels being perpendicular to the first and second elongate frame members;

a length of the first optical fiber wound around the outer cylinder of each sensing mandrel for exposure to the parameter, the first optical fiber being arranged such that exposing it to the parameter causes the length of the first optical fiber to increase and decrease in inverse proportion as the parameter increases and decreases; and a length of the second optical fiber wound around the inner cylinder of each reference mandrel inside the sealed, gas-filled cavity such that changes in the parameter inside the inner cylinder cause the length of the second optical fiber to increase and decrease in direct proportion as the parameter increases and decreases.

4. A planar fiber optic sensor in which optical signals are introduced into first and second optical fibers coupled together to form an interferometer for measuring changes in a parameter, comprising:

a frame comprising first and second elongate frame members arranged to be spaced apart and generally parallel;

a plurality of elongate sensing mandrels mounted between the first and second elongate frame members and arranged in an planar array such that their longitudinal axes are spaced apart and parallel, each of the plurality of elongate sensing mandrels comprising:
an inner cylinder; and
an outer cylinder, the inner and outer cylinders arranged to have concentric longitudinal axes such that a sealed, gas-filled cavity is formed between the inner and outer cylinders and a sealed cavity is formed inside the inner cylinder;

a plurality of elongate reference mandrels mounted between the first and second elongate frame members and arranged in an planar array such that their longitudinal axes are spaced apart and parallel, each of the plurality of elongate reference mandrels comprising:
an inner cylinder; and
an outer cylinder, the inner and outer cylinders arranged to have concentric longitudinal axes such that a cavity is formed between the inner and outer cylinders and an open-ended cavity is formed inside the inner cylinder, the cavity formed between the inner and outer cylinders of the reference mandrel being gas-filled and sealed from exposure to the parameter being measured;

a length of the first optical fiber wound around the outer cylinder of each sensing mandrel for exposure to the parameter, the first optical fiber being arranged such that exposing it to the parameter causes the length of the first optical fiber to increase and decrease in inverse proportion as the parameter increases and decreases; and a length of the second optical fiber wound around the inner cylinder of each reference mandrel inside the sealed, gas-filled cavity such that changes in the parameter inside the inner cylinder cause the length of the second optical fiber to increase and decrease in direct proportion as the parameter increases and decreases.

5. A planar fiber optic sensor in which optical signals are introduced into first and second optical fibers coupled together to form an interferometer for measuring changes in a parameter, comprising:

a frame comprising first and second elongate frame members arranged to be spaced apart and generally parallel;

a plurality of elongate sensing mandrels mounted between the first and second elongate frame members and arranged in an planar array such that their longitudinal axes are spaced apart and parallel, each of the plurality of elongate sensing mandrels comprising:
an inner cylinder; and
an outer cylinder, the inner and outer cylinders arranged to have concentric longitudinal axes such that a sealed, gas-filled cavity is formed between the inner and outer cylinders and a sealed cavity is formed inside the inner cylinder;

a plurality of elongate reference mandrels mounted between the first and second elongate frame members and arranged in an planar array such that their longitudinal axes are spaced apart and parallel, each of the plurality of elongate reference mandrels comprising:
an inner cylinder; and
an outer cylinder, the inner and outer cylinders arranged to have concentric longitudinal axes such that a cavity is formed between the inner and outer cylinders and an open-ended cavity is formed inside the inner cylinder, the cavity formed between the inner and outer cylinders of the reference mandrel being open for exposure to the parameter being measured;

a length of the first optical fiber wound around the outer cylinder of each sensing mandrel for exposure to the parameter, the first optical fiber being arranged such that exposing it to the parameter causes the length of the first optical fiber to increase and decrease in inverse proportion as the parameter increases and decreases; and a length of the second optical fiber wound around the inner cylinder of each reference mandrel inside the sealed, gas-filled cavity such that changes in the parameter inside the inner cylinder cause the length of the second optical fiber to increase and decrease in direct proportion as the parameter increases and decreases.

* * * * *